Patented Nov. 10, 1970
3,539,198
Sheet 1 of 3
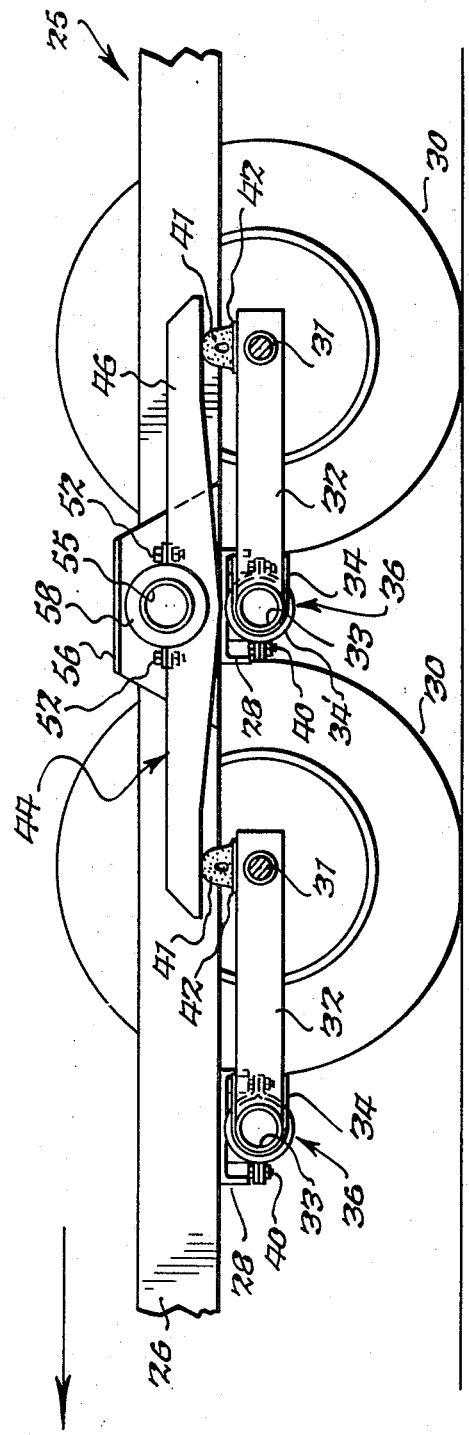
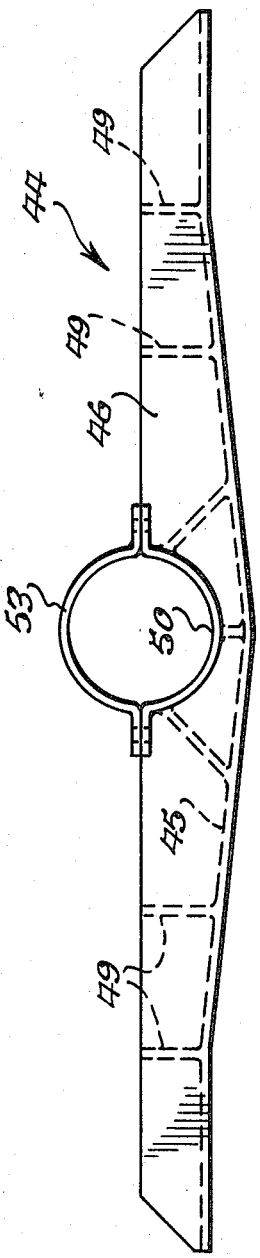
INVENTOR.
Albert F. Hickman
BY
Harold I. Popp
ATTORNEY.

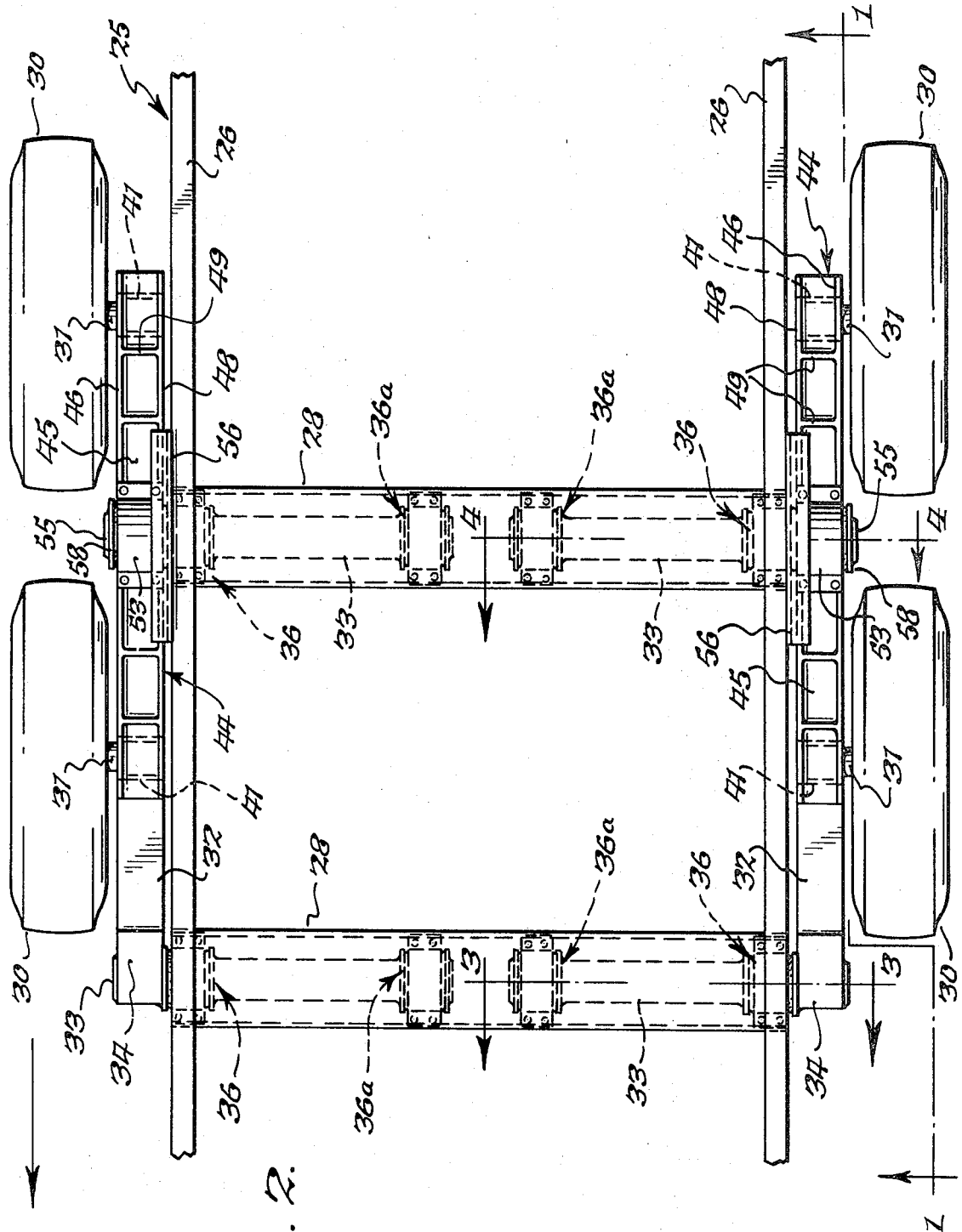

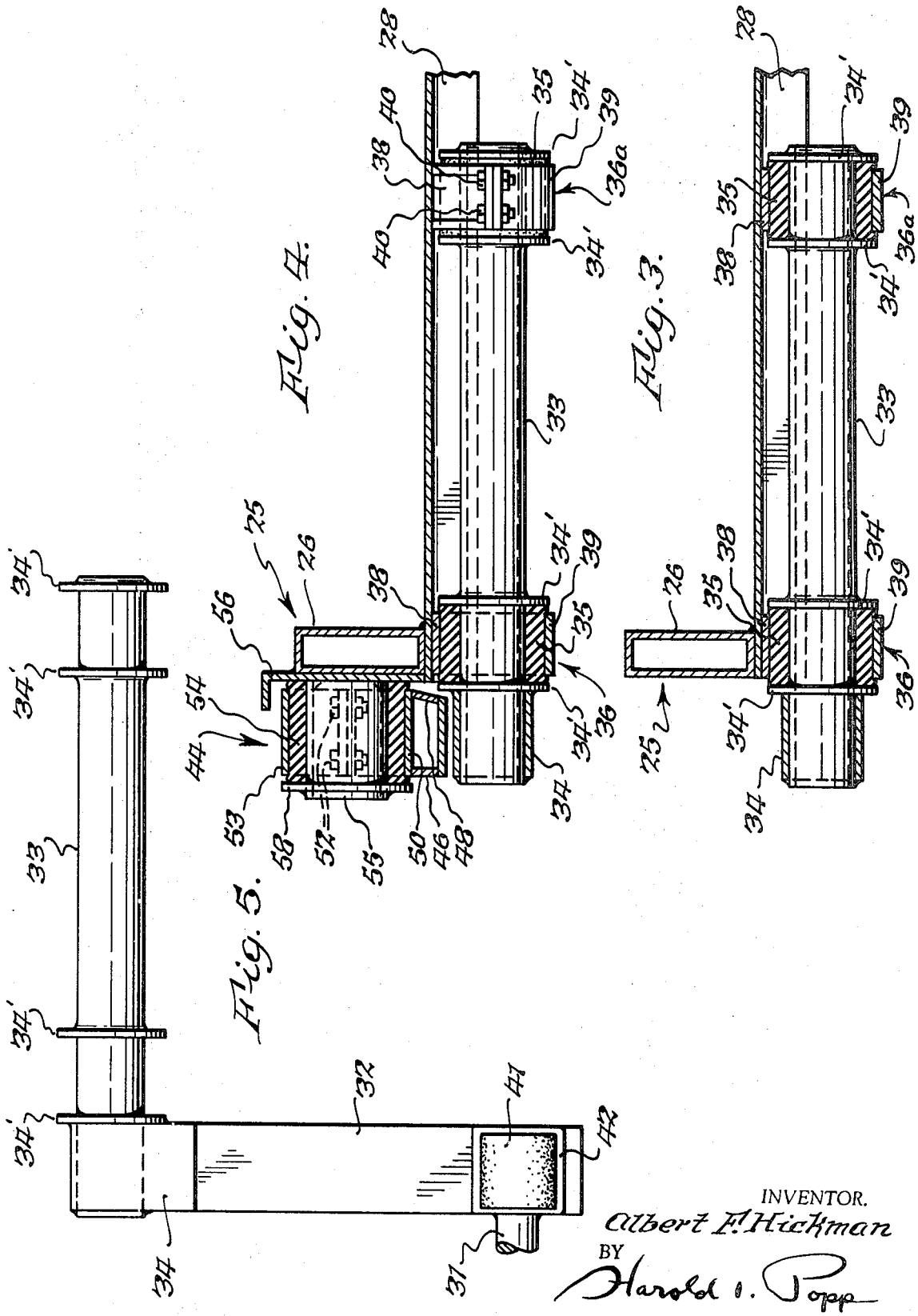

United States Patent

[11] 3,539,198

[72] Inventor Albert F. Hickman
8009 N. Gowanda State Rd., Eden, New York 14057
[21] Appl. No. 727,182
[22] Filed May 7, 1968
[45] Patented Nov. 10, 1970
Continuation-in-part of Ser. No. 591,899, Nov. 3, 1966, now Pat. No. 3,410,573, and Ser. No. 634,561, Apr. 28, 1967, now Pat. No. 3,511,332

[54] TANDEM WHEEL COMPRESSION RUBBER SPRING SUSPENSION
2 Claims, 6 Drawing Figs.
[52] U.S. Cl. .................................................. 280/104.5
[51] Int. Cl. .................................................. B60g 5/00
[50] Field of Search ...................................... 280/104.5, 104.5(A)

[56] References Cited
UNITED STATES PATENTS

| | | | |
|---|---|---|---|
| 1,902,712 | 3/1933 | Leipert | 280/104.5X |
| 1,928,860 | 10/1933 | Marcum | 280/104.5X |
| 1,940,914 | 12/1933 | Marcum | 280/104.5 |
| 3,241,856 | 3/1966 | Raidel | 280/104.5(A)UX |
| 3,410,573 | 11/1968 | Hickman | 280/104.5 |

Primary Examiner—A. Harry Levy
Attorney—Harold I. Popp

ABSTRACT: The vehicle frame has a pair of rubber-tired wheels at each side rotating on generally horizontal parallel axes one in advance of the other and the spring suspension includes a walking beam journaled intermediate its ends on each side of the frame about an axis intermediate and parallel with the wheel axes. An arm has one end journaled on a companion wheel and extends lengthwise of the vehicle line of travel and its other end is journaled on the frame on an axis generally parallel with the wheel axes. A vertically compressible rubber body is interposed between such one end of each arm and the adjacent walking beam end and each body expands horizontally to provide, jointly, the predominant resilient support for the frame on the rubber-tired wheels. Preferably each arm projects rearwardly from its fulcrum axis with reference to the vehicle travel and its hub is a cross shaft extending from the arm toward the center of the frame and supported at its opposite ends by spaced frame bearings which are preferably of the torsion rubber bushing-type to be friction free.

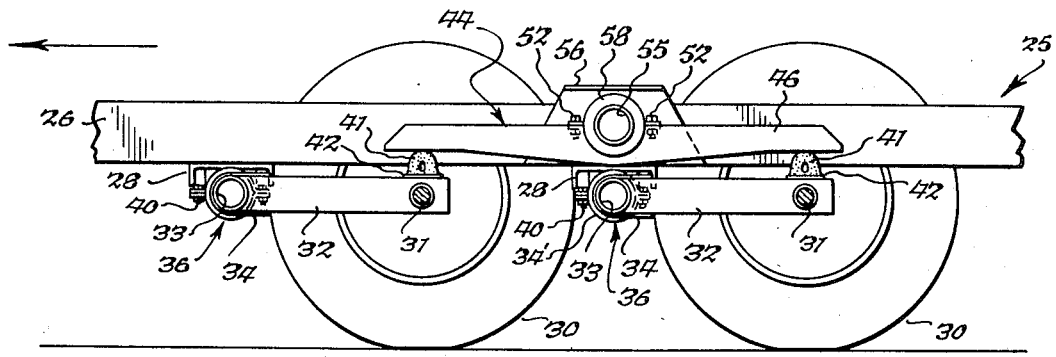

TANDEM WHEEL COMPRESSION RUBBER SPRING SUSPENSION

This application is a continuation-in-part of my copending application Ser. No. 591,899, filed Nov. 3, 1966 (now U.S. Pat. No. 3,410,573, dated Nov. 12, 1968 ) and U.S. Pat. Ser. No. 634,561, filed Apr. 28, 1967, (now U.S. Pat. No. 3,511,332 ) for Compression Rubber Spring Suspension.

In the drawings, FIG. 1 is a fragmentary vertical longitudinal section taken generally on line 1–1 of FIG. 2 and showing the parts in the position of carrying a normal load and supported at each side by a tandem wheel suspension, parts being omitted for the purpose of clarity. In this and in FIG. 2, the direction of movement of the vehicle is shown by a large overhead arrow. FIG. 2 is a fragmentary top plan view of the frame and tandem wheel suspension shown in FIG. 1. FIGS. 3 and 4 are enlarged vertical transverse sections taken on the correspondingly numbered lines, FIG. 2. FIG. 5 is an enlarged, fragmentary, top plan view of one of the arms having a stub axle adapted to be supported by its wheel and having a hub member adapted to support and be journaled on the vehicle frame in the manner shown in FIGS. 3 or 4. FIG. 6 is a detached side elevational view of one of the walking beams of the suspension.

The vehicle frame 25 can be of any suitable construction and is shown as comprising a pair of tubular main longitudinal side frame bars 26 which are shown as straight and parallel and as connected at spaced intervals with downwardly opening cross channel bars 28 each of which forms an anchorage for the bearing of a corresponding pair of rubber-tired wheels 30 on opposite sides of the frame.

In both forms of the invention, the frame 25 is supported by these rubber-tired wheels 30, which can be single wheels, as shown, or dual-tired wheels, that is, pairs of rim structures bolted together side-by-side. In either case each single- or dual-tired wheel is journaled on a tubular stub axle 31 in any suitable manner (not shown), these stub axles extending horizontally transversely of the line of travel of the vehicle and the pair of stub axles 31 at opposite sides of the vehicle being normally in line with each other as shown in FIG. 2.

Each stub axle 31 is welded or otherwise fixed to the end of an arm 32 which can be of any suitable form but is shown as being of rectangular cross-sectional form with its stub axle 31 extending through its sidewalls and being welded to its outboard end as best shown in FIG. 5. To the inboard end of each arm 32 is fixed a tubular hub member 33 as by a C-shaped plate 34 which embraces and is welded to both the arm 32 and its hub member 33 to provide a rigid structure in which the hub member is fixed to and parallel with its stub axle 31 but extends in the opposite direction from the arm 32, that is, the stub axle 31 projects outwardly from the vehicle, whereas the hub member 33 projects toward the center of the vehicle frame 25.

As best shown in FIGS. 3 and 4, each hub member 33 is arranged directly under and preferably partly within the downwardly opening channel of a companion cross frame bar 28, and is provided at its opposite ends with two pairs of spaced rings 34' welded to and projecting radially from its periphery, each pair of these rings serving to prevent the axial displacement of a rubber bushing 35 of an outboard or first bearing, designated at 36, and an inboard or second bearing, designated at 36a, these bearings being identical so that the same description and reference numerals apply.

The rubber bushings 35 of each of these bearings is embraced by an upper-half bearing housing 38 which can be welded inside the channel of its cross frame bar 28 in any suitable manner, and by a lower-half bearing housing 39 secured, as by bolts 40, to its upper-half bearing housing 38 so as to compress the rubber bushing 35 against the periphery of its hub member 33 between its pair of welded rings 34'.

A feature of the invention resides in each arm 32 trailing or projecting rearwardly from its hub structure 33 with reference to the line of travel of the vehicle. On top of the rear or outboard end of each arm 32 is mounted an upstanding rubber body 41, these rubber bodies acting, in vertical compression, to support the frame 25 on the rubber-tired wheels 30 and provide the predominant resilient support for the frame on these rubber-tired wheels, the rubber bushings 35 functioning essentially as friction free bearings and not to provide such resilient support. These rubber bodies 41 are vulcanized to the top faces of mounting plates 42 suitable secured on the ends of the arms 32 and are preferably constructed in the manner set forth in may copending U.S. Pat. application Ser. No. 732,799, filed May 7, 1968, for Compression Rubber Spring and provide such resilient support for the frame 25 through a walking beam 44 which is preferably constructed as follows.

Referring particularly to FIGS. 2, 4 and 6, the numeral 45 represents the bottom wall of an upwardly opening channel beam, the outside upright wall of which is designated at 46, the inside upright wall at 48 and these walls being internally braced by cross ribs or plates 49. The opposite ends of the bottom wall 45 rest on the compression rubber blocks 41 and the centers of the sidewalls 46, 48 are formed to receive and are welded to a lower-half bearing housing 50 of a frame bearing 51. This lower-half bearing housing 50 is secured, as by bolts 52 to an upper-half bearing housing 53 to embrace a rubber bushing 54 to hold it in compressed relation with a supporting tube 55 which projects horizontally outwardly from the corresponding frame side bar 26. For this purpose each supporting tube 55 is welded to project from the side of a corresponding frame bucket 56, one end of the compressed rubber bushing 54 abutting against this frame bracket and the other end abutting against a radially projecting ring 58 welded to the outboard end of this tube, as best shown in FIG. 4.

OPERATION

The direction of movement of the vehicle is shown by the large arrows above FIGS. 1 and 2 and in the operation of this form of the invention, the upward movement of one, say, the front wheel 30 and its stub axle 31 effects corresponding upward movement of the rearward outboard end of its boxlike tubular arm 32 and counterclockwise movement, as viewed in FIG. 1, of the hub member or tubular cross shaft 33 fixed thereto, such movement being permitted by the rubber bushings 35 of its outboard and inboard bearings 36, 36a, as shown in FIG. 3.

Through the vertically compressible rubber block 41 at the rear end of this forward arm 32, this movement of this arm is transmitted upwardly to the forward end of the walking beam 44 to rotate this walking beam clockwise, as viewed in FIG. 1, this walking beam movement being permitted by the rubber bushing 54 of its center frame bearing 51, as shown in FIG. 4. This effects downward movement of the rear end of this walking beam 44, and through the vertically compressible rubber block 41 at the rear end of the rearward arm 32, this movement of the walking beam 44 is transmitted downwardly to this rear end of the rearward arm 32 to rotate this arm clockwise as viewed in FIG. 1. This movement of this rearward arm 32 is permitted by the rubber bushings 35 of its outboard and inboard bearings 36, 36a, as shown in FIG. 4. This downward force of the rear end of this walking beam 44 through this rearward arm 32 against the rear stub axle 31 serves to equalize the load between the pair of wheels 30 at the side of the vehicle frame under consideration. It will be noted that substantially all of the resilient resistance to such vertical movement of any of the wheels 30 is provided by the rubber bodies 41 acted on in direct compression, but that the entire suspension is friction free, the journals being provided by the rubber bushings 35 and 53 which are twisted for this purpose. It will also be noted that the hub member 33 of each box-form arm 32 is supported by the widely spaced friction free rubber bushings 35 of the bearings 36, 36a so that there is no effective corner loading of either of these bearings while at the same time the arms 32 are constrained to substantially vertical movement.

By "rubber" as used in the accompanying claims is meant natural rubber, synthetic rubber or mixture of natural and synthetic rubber.

I claim:
1. A tandem axle spring suspension adapted to be interposed between a vehicle frame and a pair of rubber-tired wheels arranged at each side of the frame on generally parallel and horizontal axes of rotation one in advance of the other and the spring suspension having a rigid walking beam member journaled adjacent its center to each side of said frame to oscillate about an axis of oscillation generally parallel with and located between said axes of rotation of the corresponding pair of wheels; wherein the improvement comprises a pair of arm members at each side of the frame, each arm member having one end journaled to a companion wheel concentric with its said axis of rotation and extending therefrom lengthwise of and forwardly, with reference to the forward direction of travel of the vehicle, a hub connected to the other end of each arm member, means journaling said hub to said frame on a fulcrum axis generally parallel with and in advance, with reference to said forward direction of travel of the vehicle, of said axis of rotation of its wheel, said journaling means including a cross rod at said other end of each arm member and extending toward the center of said frame, a first frame bearing arranged adjacent each arm member and supported by the outer end of its rod, and a second frame bearing supported by the inner end of each rod and arranged adjacent the center of said frame, and a vertically compressible flexible rubber body interposed between the said one end of each arm member and the adjacent end of the rigid walking beam member and compressed therebetween along a generally vertical line of force, each said rubber body being substantially symmetrical on opposite sides of its said line of force and being so compressed substantially exclusively along its line of force and its said opposite sides being unconfined and free to expand and contract substantially equally in opposite directions transversely of its said line of force and such expansion and contraction providing substantially the entire resiliency in supporting said rigid walking beam members and frame on said rubber-tired wheels.

2. The combination set forth in claim 1 wherein one face of each of said rubber bodies is secured to one of said members with the opposite face having full-time, nonadhering touching contact only with the other of said members.